(12) United States Patent
Cuellar et al.

(10) Patent No.: US 7,631,516 B2
(45) Date of Patent: Dec. 15, 2009

(54) LIQUEFIED NATURAL GAS PROCESSING

(75) Inventors: Kyle T. Cuellar, Katy, TX (US); John D. Wilkinson, Midland, TX (US); Hank M. Hudson, Midland, TX (US)

(73) Assignee: Ortloff Engineers, Ltd., Midland, TX (US)

( * ) Notice: Subject to any disclaimer, the term of this patent is extended or adjusted under 35 U.S.C. 154(b) by 301 days.

(21) Appl. No.: 11/749,268

(22) Filed: May 16, 2007

(65) Prior Publication Data

US 2008/0000265 A1 Jan. 3, 2008

Related U.S. Application Data

(60) Provisional application No. 60/810,244, filed on Jun. 2, 2006, provisional application No. 60/812,686, filed on Jun. 8, 2006.

(51) Int. Cl.
F25J 3/00 (2006.01)
(52) U.S. Cl. ............................... 62/620; 62/628; 62/630
(58) Field of Classification Search ................. 62/620, 62/630, 628
See application file for complete search history.

(56) References Cited

U.S. PATENT DOCUMENTS

| 2,603,310 | A | | 7/1952 | Gilmore ....................... 62/625 |
| 2,880,592 | A | | 4/1959 | Davison et al. ............... 62/621 |
| 2,952,984 | A | * | 9/1960 | Marshall, Jr. ................. 62/622 |

(Continued)

FOREIGN PATENT DOCUMENTS

FR     1.535.846      8/1968

(Continued)

OTHER PUBLICATIONS

Finn, Adrian J., Grant L. Johnson, and Terry R. Tomilson, "LNG Technology for Offshore and Mid-Scale Plants", Proceedings of the Seventy-Ninth Annual Convention of the Gas Processors Association, pp. 429-450, Atlanta, Georgia, Mar. 13-15, 2000.

(Continued)

*Primary Examiner*—William C Doerrler
(74) *Attorney, Agent, or Firm*—Fitzpatrick, Cella, Harper & Scinto

(57) ABSTRACT

A process and apparatus for the recovery of ethane, ethylene, propane, propylene, and heavier hydrocarbons from a liquefied natural gas (LNG) stream is disclosed. The LNG feed stream is divided into two portions. The first portion is supplied to a fractionation column at an upper mid-column feed point. The second portion is directed in heat exchange relation with a warmer distillation stream rising from the fractionation stages of the column, whereby this portion of the LNG feed stream is partially vaporized and the distillation stream is totally condensed. The condensed distillation stream is divided into a "lean" LNG product stream and a reflux stream, whereupon the reflux stream is supplied to the column at a top column feed position. The partially vaporized portion of the LNG feed stream is separated into vapor and liquid streams which are thereafter supplied to the column at lower mid-column feed positions. The quantities and temperatures of the feeds to the column are effective to maintain the column overhead temperature at a temperature whereby the major portion of the desired components is recovered in the bottom liquid product from the column.

38 Claims, 4 Drawing Sheets

U.S. PATENT DOCUMENTS

Figure 1:
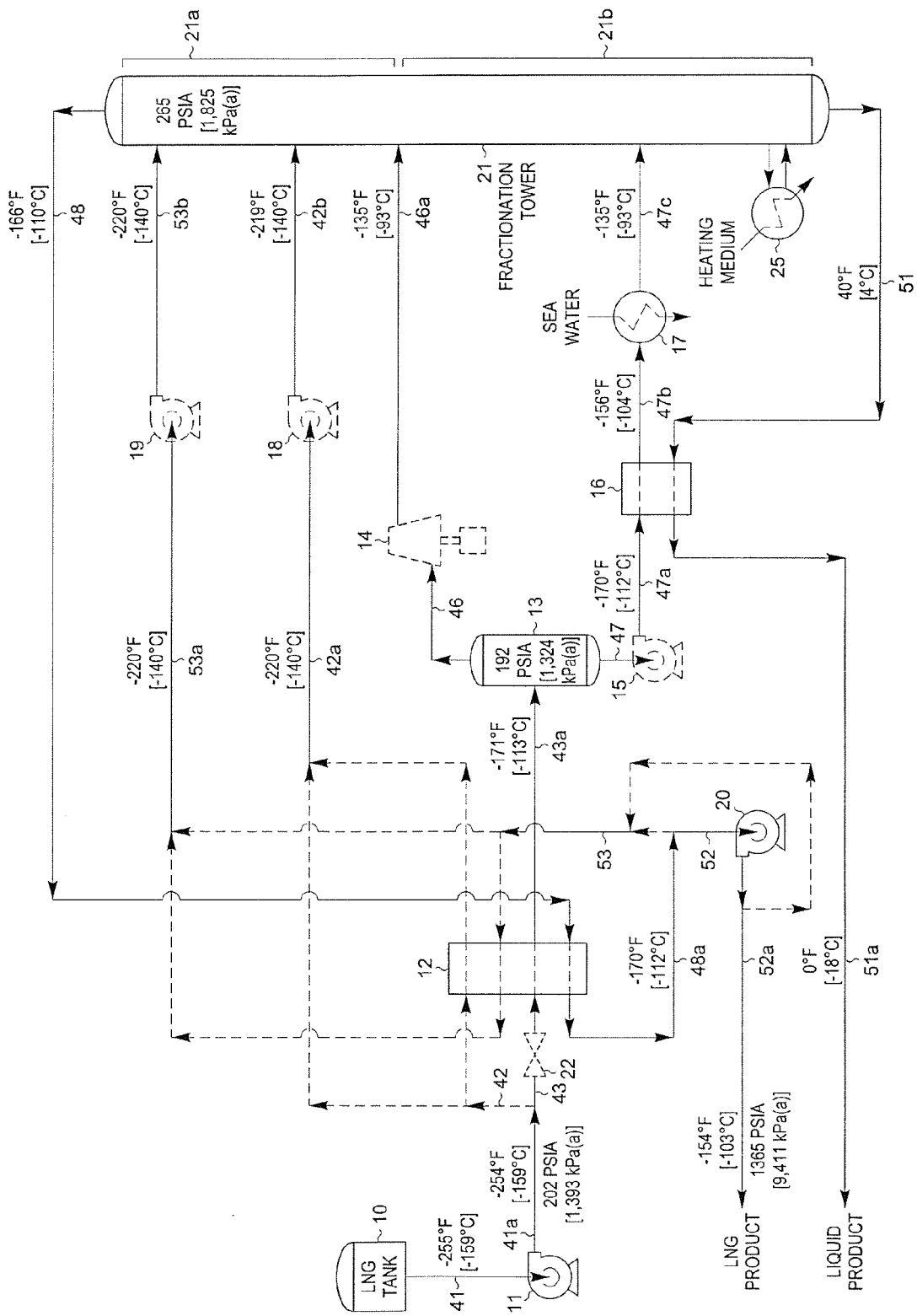

| | | | | |
|---|---|---|---|---|
| 3,292,380 A | 12/1966 | Bucklin | ............... | 62/621 |
| 3,724,226 A | 4/1973 | Pachaly | ............... | 62/613 |
| 3,763,658 A | 10/1973 | Garumer, Jr. et al. | ............... | 62/612 |
| 3,837,172 A | 9/1974 | Markbreiter et al. | ............... | 62/621 |
| 4,033,735 A | 7/1977 | Swenson | ............... | 62/612 |
| 4,061,481 A | 12/1977 | Campbell et al. | ............... | 62/621 |
| 4,065,278 A | 12/1977 | Newton et al. | ............... | 62/622 |
| 4,140,504 A | 2/1979 | Campbell et al. | ............... | 62/621 |
| 4,157,904 A | 6/1979 | Campbell et al. | ............... | 62/623 |
| 4,171,964 A | 10/1979 | Campbell et al. | ............... | 62/621 |
| 4,251,249 A | 2/1981 | Gulsby | ............... | 62/621 |
| 4,278,457 A | 7/1981 | Campbell et al. | ............... | 62/621 |
| 4,368,061 A | 1/1983 | Mestrallet et al. | ............... | 62/630 |
| 4,404,008 A | 9/1983 | Rentler et al. | ............... | 62/612 |
| 4,430,103 A | 2/1984 | Gray et al. | ............... | 62/620 |
| 4,445,916 A | 5/1984 | Newton | ............... | 62/625 |
| 4,445,917 A | 5/1984 | Chiu | ............... | 62/625 |
| 4,453,958 A | 6/1984 | Gulsby et al. | ............... | 62/621 |
| 4,519,824 A | 5/1985 | Huebel | ............... | 62/621 |
| 4,525,185 A | 6/1985 | Newton | ............... | 62/612 |
| 4,545,795 A | 10/1985 | Liu et al. | ............... | 62/613 |
| 4,592,766 A | 6/1986 | Kumman et al. | ............... | 62/621 |
| 4,596,588 A | 6/1986 | Cook | ............... | 62/621 |
| 4,600,421 A | 7/1986 | Kummann | ............... | 62/621 |
| 4,617,039 A | 10/1986 | Buck | ............... | 62/621 |
| 4,657,571 A | 4/1987 | Gazzi | ............... | 62/621 |
| 4,676,812 A | 6/1987 | Kummann | ............... | 62/622 |
| 4,687,499 A | 8/1987 | Aghili | ............... | 62/621 |
| 4,689,063 A | 8/1987 | Paradiwski et al. | ............... | 62/627 |
| 4,690,702 A | 9/1987 | Paradowski et al. | ............... | 62/621 |
| 4,698,081 A * | 10/1987 | Aghili | ............... | 62/621 |
| 4,707,170 A | 11/1987 | Ayres et al. | ............... | 62/627 |
| 4,710,214 A | 12/1987 | Sharma et al. | ............... | 62/621 |
| 4,711,651 A | 12/1987 | Sharma et al. | ............... | 62/630 |
| 4,718,927 A | 1/1988 | Bauer et al. | ............... | 62/621 |
| 4,720,294 A | 1/1988 | Lucadamo et al. | ............... | 62/627 |
| 4,738,699 A | 4/1988 | Apffel | ............... | 62/623 |
| 4,752,312 A | 6/1988 | Prible | ............... | 62/622 |
| 4,755,200 A | 7/1988 | Liu et al. | ............... | 62/612 |
| 4,793,841 A | 12/1988 | Burr | ............... | 62/624 |
| 4,851,020 A | 7/1989 | Montgomery et al. | ............... | 62/621 |
| 4,854,955 A | 8/1989 | Campbell et al. | ............... | 62/621 |
| 4,869,740 A | 9/1989 | Campbell et al. | ............... | 62/621 |
| 4,881,960 A | 11/1989 | Ranke et al. | ............... | 62/632 |
| 4,889,545 A | 12/1989 | Campbell et al. | ............... | 62/621 |
| 4,895,584 A | 1/1990 | Buck et al. | ............... | 62/621 |
| RE33,408 E | 10/1990 | Khan et al. | ............... | 62/621 |
| 4,970,867 A | 11/1990 | Herron et al. | ............... | 62/613 |
| 5,114,451 A * | 5/1992 | Rambo et al. | ............... | 62/623 |
| 5,114,541 A | 5/1992 | Bayer | ............... | 201/2.5 |
| 5,275,005 A | 1/1994 | Campbell et al. | ............... | 62/621 |
| 5,291,736 A | 3/1994 | Paradowski | ............... | 62/613 |
| 5,325,673 A | 7/1994 | Durr et al. | ............... | 62/634 |
| 5,363,655 A | 11/1994 | Kikkawa et al. | ............... | 62/613 |
| 5,537,827 A | 7/1996 | Low et al. | ............... | 62/613 |
| 5,555,748 A | 9/1996 | Campbell et al. | ............... | 62/621 |
| 5,566,554 A | 10/1996 | Vijayaraghavan et al. | ............... | 62/621 |
| 5,568,737 A | 10/1996 | Campbell et al. | ............... | 62/621 |
| 5,600,969 A | 2/1997 | Low | ............... | 62/622 |
| 5,615,561 A | 4/1997 | Houshmand et al. | ............... | 62/611 |
| 5,651,269 A | 7/1997 | Prevost et al. | ............... | 62/613 |
| 5,669,234 A | 9/1997 | Houser et al. | ............... | 62/612 |
| 5,737,940 A | 4/1998 | Yao et al. | ............... | 62/620 |
| 5,755,114 A | 5/1998 | Foglietta | ............... | 62/618 |
| 5,755,115 A | 5/1998 | Manley | ............... | 62/620 |
| 5,771,712 A | 6/1998 | Campbell et al. | ............... | 62/621 |
| 5,799,507 A | 9/1998 | Wilkinson et al. | ............... | 62/621 |
| 5,881,569 A | 3/1999 | Campbell et al. | ............... | 62/621 |
| 5,890,378 A | 4/1999 | Rambo et al. | ............... | 62/621 |
| 5,893,274 A | 4/1999 | Nagelvoort et al. | ............... | 62/613 |
| 5,950,453 A | 9/1999 | Bowen et al. | ............... | 62/612 |
| 5,983,664 A | 11/1999 | Campbell et al. | ............... | 62/621 |
| 6,014,869 A | 1/2000 | Elion et al. | ............... | 62/621 |
| 6,016,665 A | 1/2000 | Cole et al. | ............... | 62/612 |
| 6,023,942 A | 2/2000 | Thomas et al. | ............... | 62/613 |
| 6,053,007 A | 4/2000 | Victory et al. | ............... | 62/619 |
| 6,062,041 A | 5/2000 | Kikkawa et al. | ............... | 62/613 |
| 6,116,050 A | 9/2000 | Yao et al. | ............... | 62/630 |
| 6,119,479 A | 9/2000 | Roberts et al. | ............... | 62/612 |
| 6,125,653 A | 10/2000 | Shu et al. | ............... | 62/622 |
| 6,182,469 B1 | 2/2001 | Campbell et al. | ............... | 62/621 |
| 6,250,105 B1 | 6/2001 | Kimble | ............... | 62/613 |
| 6,269,655 B1 | 8/2001 | Roberts et al. | ............... | 62/612 |
| 6,272,882 B1 | 8/2001 | Hodges et al. | ............... | 62/613 |
| 6,308,531 B1 | 10/2001 | Roberts et al. | ............... | 62/611 |
| 6,324,867 B1 | 12/2001 | Fanning et al. | ............... | 62/613 |
| 6,336,344 B1 | 1/2002 | O'Brien | ............... | 62/627 |
| 6,347,532 B1 | 2/2002 | Agrawal et al. | ............... | 62/612 |
| 6,363,744 B2 | 4/2002 | Finn et al. | ............... | 62/621 |
| 6,367,286 B1 | 4/2002 | Price | ............... | 62/613 |
| 6,401,486 B1 | 6/2002 | Lee et al. | ............... | 62/630 |
| 6,526,777 B1 | 3/2003 | Campbell et al. | ............... | 62/621 |
| 6,604,380 B1 | 8/2003 | Reddick et al. | ............... | 62/620 |
| 6,742,358 B2 | 6/2004 | Wilkinson et al. | ............... | 62/613 |
| 6,907,752 B2 | 6/2005 | Schroeder et al. | ............... | 62/620 |
| 6,941,771 B2 | 9/2005 | Reddick et al. | ............... | 62/620 |
| 7,069,743 B2 | 7/2006 | Prim | ............... | 62/620 |
| 7,155,931 B2 | 1/2007 | Wilkinson et al. | ............... | 62/620 |
| 7,216,507 B2 * | 5/2007 | Cuellar et al. | ............... | 62/620 |
| 2003/0158458 A1 | 8/2003 | Prim | ............... | 585/800 |
| 2004/0079107 A1 | 4/2004 | Wilkinson et al. | ............... | 62/611 |
| 2005/0061029 A1 | 3/2005 | Narinsky | ............... | 62/620 |
| 2005/0066686 A1 * | 3/2005 | Wilkinson et al. | ............... | 62/620 |
| 2005/0155381 A1 | 7/2005 | Yang et al. | ............... | 62/620 |
| 2006/0000234 A1 | 1/2006 | Cuellar et al. | ............... | 62/620 |

FOREIGN PATENT DOCUMENTS

| | | |
|---|---|---|
| GB | 2 102 931 A | 2/1983 |
| SU | 1606828 A1 | 10/1986 |
| WO | WO 01/88447 A1 | 11/2001 |
| WO | WO 2004/109180 A1 | 12/2004 |
| WO | WO 2005/015100 A1 | 2/2005 |
| WO | WO 2005/035692 A2 | 4/2005 |

OTHER PUBLICATIONS

Kikkawa, Yoshitsugi, Masaaki Ohishi, and Noriyoshi Nozawa, "Optimize the Power System of Baseload LNG Plant", Proceedings of the Eightieth Annual Convention of the Gas Processors Association, San Antonio, Texas, Mar. 12-14, 2001.

Price, Brian C., "LNG Production for Peak Shaving Operations", Proceedings of the Seventy-Eighth Annual Convention of the Gas Processors Association, pp. 273-280, Nashville, Tennessee, Mar. 1-3, 1999.

Huang et al., "Select the Optimum Extraction Method for LNG Regasification; Varying Energy Compositions of LNG Imports may Require Terminal Operators to Remove $C_2$+ Compounds before Injecting Regasified LNG into Pipelines", *Hydrocarbon Processing*, 83, 57-62, Jul. 2004.

Yang et al., "Cost-Effective Design Reduces $C_2$ and $C_3$ at LNG Receiving Terminals", *Oil & Gas Journal*, 50-53, May 26, 2003.

\* cited by examiner

LIQUEFIED NATURAL GAS PROCESSING

CROSS REFERENCE TO RELATED APPLICATIONS

The applicants claim the benefits under Title 35, United States Code, Section 119(e) of prior U.S. Provisional Application Nos. 60/810,244 which was filed on Jun. 2, 2006 and 60/812,686 which was filed on Jun. 8, 2006.

BACKGROUND OF THE INVENTION

This invention relates to a process for the separation of ethane and heavier hydrocarbons or propane and heavier hydrocarbons from liquefied natural gas, hereinafter referred to as LNG, to provide a volatile methane-rich lean LNG stream and a less volatile natural gas liquids (NGL) or liquefied petroleum gas (LPG) stream.

As an alternative to transportation in pipelines, natural gas at remote locations is sometimes liquefied and transported in special LNG tankers to appropriate LNG receiving and storage terminals. The LNG can then be re-vaporized and used as a gaseous fuel in the same fashion as natural gas. Although LNG usually has a major proportion of methane, i.e., methane comprises at least 50 mole percent of the LNG, it also contains relatively lesser amounts of heavier hydrocarbons such as ethane, propane, butanes, and the like, as well as nitrogen. It is often necessary to separate some or all of the heavier hydrocarbons from the methane in the LNG so that the gaseous fuel resulting from vaporizing the LNG conforms to pipeline specifications for heating value. In addition, it is often also desirable to separate the heavier hydrocarbons from the methane because these hydrocarbons have a higher value as liquid products (for use as petrochemical feedstocks, as an example) than their value as fuel.

Although there are many processes which may be used to separate ethane and heavier hydrocarbons from LNG, these processes often must compromise between high recovery, low utility costs, and process simplicity (and hence low capital investment). U.S. Pat. Nos. 2,952,984; 3,837,172; 5,114,451; and 7,155,931 describe relevant LNG processes capable of ethane or propane recovery while producing the lean LNG as a vapor stream that is thereafter compressed to delivery pressure to enter a gas distribution network. However, lower utility costs may be possible if the lean LNG is instead produced as a liquid stream that can be pumped (rather than compressed) to the delivery pressure of the gas distribution network, with the lean LNG subsequently vaporized using a low level source of external heat or other means. U.S. Pat. Nos. 7,069,743 and 7,216,507 describe such processes.

The present invention is generally concerned with the recovery of ethylene, ethane, propylene, propane, and heavier hydrocarbons from such LNG streams. It uses a novel process arrangement to allow high ethane or high propane recovery while keeping the processing equipment simple and the capital investment low. Further, the present invention offers a reduction in the utilities (power and heat) required to process the LNG to give lower operating cost than the prior art processes, and also offers significant reduction in capital investment. A typical analysis of an LNG stream to be processed in accordance with this invention would be, in approximate mole percent, 89.8% methane, 6.5% ethane and other $C_2$ components, 2.2% propane and other $C_3$ components, and 1.0% butanes plus, with the balance made up of nitrogen.

Figure 2:
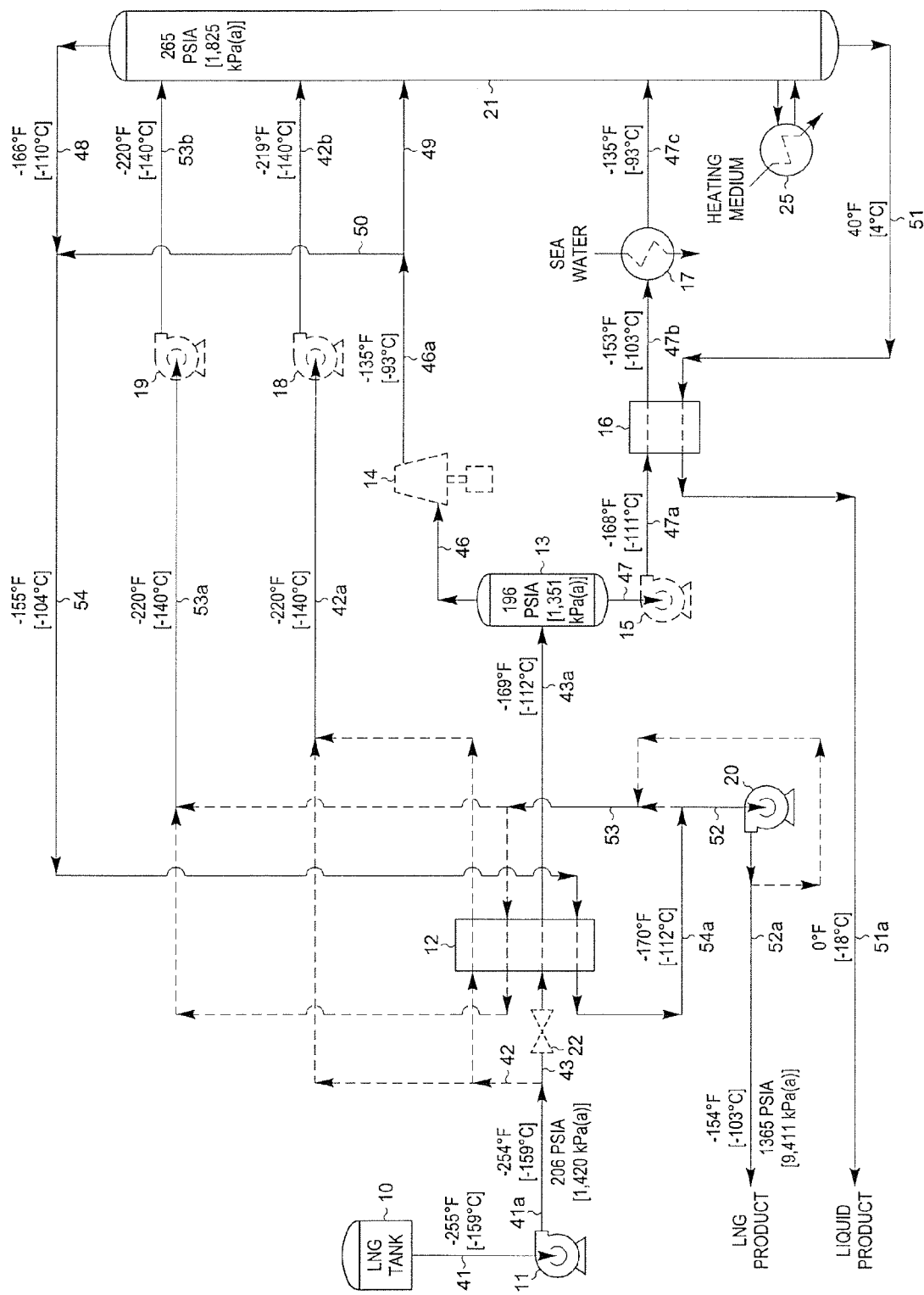
Figure 3:
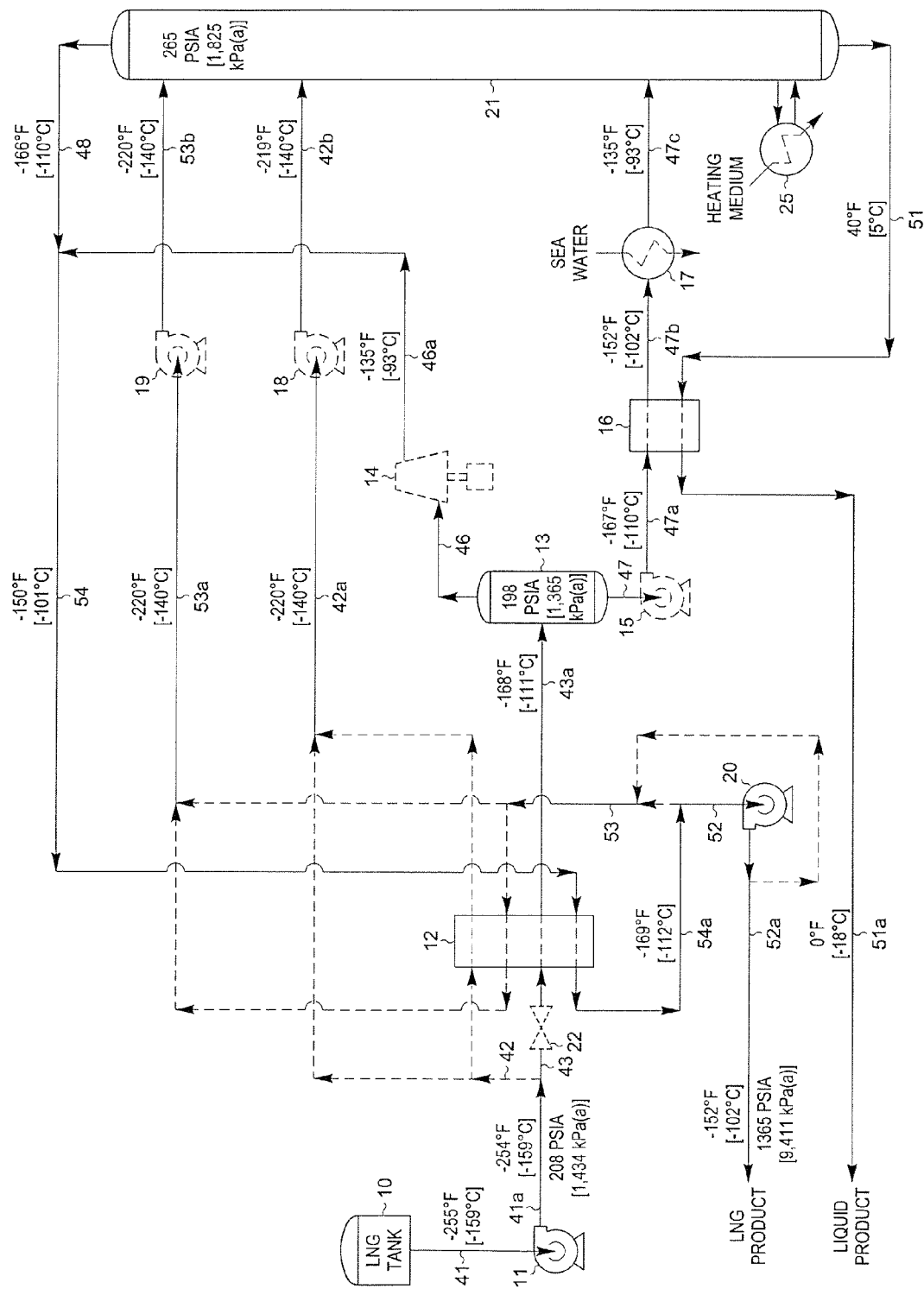
Figure 4:
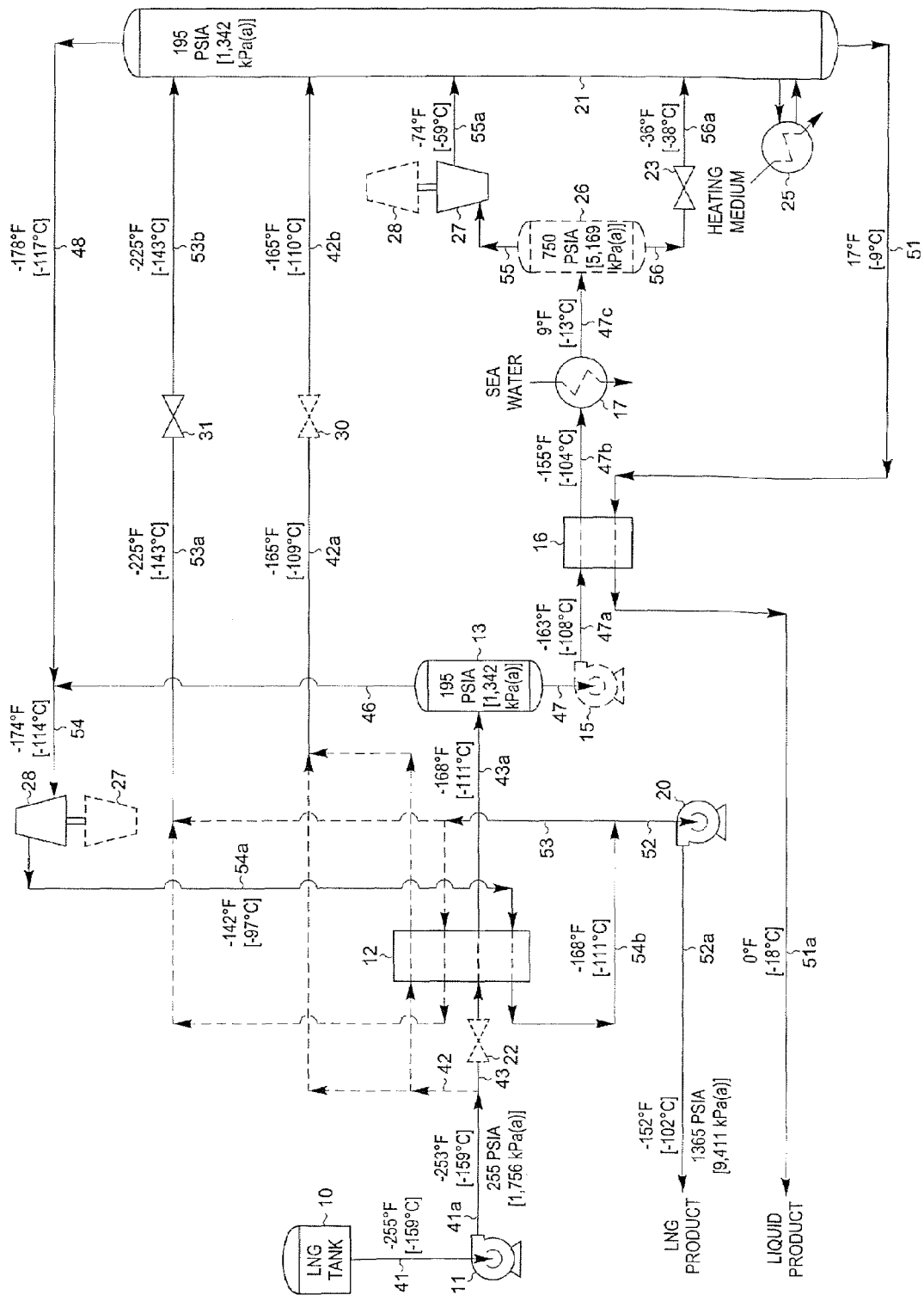

For a better understanding of the present invention, reference is made to the following examples and drawings. Referring to the drawings:

FIG. 1 is a flow diagram of an LNG processing plant in accordance with the present invention; and FIGS. 2, 3, and 4 are flow diagrams illustrating alternative means of application of the present invention to an LNG processing plant.

In the following explanation of the above figures, tables are provided summarizing flow rates calculated for representative process conditions. In the tables appearing herein, the values for flow rates (in moles per hour) have been rounded to the nearest whole number for convenience. The total stream rates shown in the tables include all non-hydrocarbon components and hence are generally larger than the sum of the stream flow rates for the hydrocarbon components. Temperatures indicated are approximate values rounded to the nearest degree. It should also be noted that the process design calculations performed for the purpose of comparing the processes depicted in the figures are based on the assumption of no heat leak from (or to) the surroundings to (or from) the process. The quality of commercially available insulating materials makes this a very reasonable assumption and one that is typically made by those skilled in the art.

For convenience, process parameters are reported in both the traditional British units and in the units of the Système International d'Unités (SI). The molar flow rates given in the tables may be interpreted as either pound moles per hour or kilogram moles per hour. The energy consumptions reported as horsepower (HP) and/or thousand British Thermal Units per hour (MBTU/Hr) correspond to the stated molar flow rates in pound moles per hour. The energy consumptions reported as kilowatts (kW) correspond to the stated molar flow rates in kilogram moles per hour.

DESCRIPTION OF THE INVENTION

Example 1

FIG. 1 illustrates a flow diagram of a process in accordance with the present invention adapted to produce an NGL product containing the majority of the $C_2$ components and heavier hydrocarbon components present in the feed stream.

In the simulation of the FIG. 1 process, the LNG to be processed (stream 41) from LNG tank 10 enters pump 11 at −255° F. [−159° C.], which elevates the pressure of the LNG sufficiently so that it can flow through heat exchangers and thence to separator 13. Stream 41a exiting the pump is split into two portions, streams 42 and 43. The first portion, stream 42, is heated to −220° F. [−140° C.] (stream 42a) in heat exchanger 12 and then is pumped to higher pressure by pump 18. Pumped stream 42b at −219° F. [−140° C.] is then supplied to fractionation column 21 at an upper mid-column feed point.

The second portion of stream 41a (stream 43) is heated prior to entering separator 13 so that at least a portion of it is vaporized. In the example shown in FIG. 1, stream 43 is heated in heat exchanger 12 by cooling overhead vapor distillation stream 48 and reflux stream 53. The heated stream 43a enters separator 13 at −171° F. [−113° C.] and 192 psia [1,324 kPa(a)] where the vapor (stream 46) is separated from any remaining liquid (stream 47). Stream 46 enters compressor 14 (driven by an external power source) and is compressed to a pressure high enough to enter fractionation tower 21, operating at approximately 265 psia [1,825 kPa(a)]. The compressed vapor stream 46a is thereafter supplied as feed to fractionation column 21 at a mid-column feed point.

The separator liquid (stream 47) is pumped to higher pressure by pump 15, and stream 47a is then heated to −156° F. [−104° C.] in heat exchanger 16 by providing cooling of the liquid product from the column (stream 51). The partially heated stream 47b is then further heated to −135° F. [−93° C.] (stream 47c) in heat exchanger 17 using low level utility heat before it is supplied to fractionation tower 21 at a lower mid-column feed point. (High level utility heat, such as the heating medium used in tower reboiler 25, is normally more expensive than low level utility heat, so lower operating cost is usually achieved when the use of low level heat, such as the sea water used in this example, is maximized and the use of high level heat is minimized.)

Note that in all cases heat exchangers 12, 16, and 17 are representative of either a multitude of individual heat exchangers or a single multi-pass heat exchanger, or any combination thereof. (The decision as to whether to use more than one heat exchanger for the indicated heating services will depend on a number of factors including, but not limited to, inlet LNG flow rate, heat exchanger size, stream temperatures, etc.) Alternatively, heat exchangers 16 and/or 17 could be replaced by other heating means, such as a heater using sea water as illustrated in FIG. 1, a heater using a utility stream rather than a process stream (like stream 51 used in FIG. 1), an indirect fired heater, or a heater using a heat transfer fluid warmed by ambient air, as warranted by the particular circumstances.

The demethanizer in fractionation column 21 is a conventional distillation column containing a plurality of vertically spaced trays, one or more packed beds, or some combination of trays and packing. As is often the case in natural gas processing plants, the fractionation tower may consist of two sections. The upper absorbing (rectification) section 21a contains the trays and/or packing to provide the necessary contact between the vapors rising upward and cold liquid falling downward to condense and absorb the ethane and heavier components in the vapors; the lower stripping (demethanizing) section 21b contains the trays and/or packing to provide the necessary contact between the liquids falling downward and the vapors rising upward. The demethanizing section also includes one or more reboilers (such as reboiler 25) which heat and vaporize a portion of the liquids flowing down the column to provide the stripping vapors which flow up the column. These vapors strip the methane from the liquids, so that the bottom liquid product (stream 51) is substantially devoid of methane and comprised of the majority of the $C_2$ components and heavier hydrocarbons contained in the LNG feed stream. The liquid product stream 51 exits the bottom of the tower at 40° F. [4° C.], based on a methane fraction of 0.008 on a molar basis in the bottom product. After cooling to 0° F. [−18° C.] in heat exchanger 16 as described previously, the liquid product (stream 51a) flows to storage or further processing.

Overhead vapor distillation stream 48 is withdrawn from the upper section of fractionation tower 21 at −166° F. [−110° C.] and is totally condensed as it is cooled to −170° F. [−112° C.] in heat exchanger 12 as described previously. The condensed liquid (stream 48a) is then divided into two portions, streams 52 and 53. The first portion (stream 52) is the methane-rich lean LNG stream, which is then pumped by pump 20 to 1365 psia [9,411 kPa(a)] (stream 52a) for subsequent vaporization and/or transportation.

The remaining portion is reflux stream 53, which flows to heat exchanger 12 where it is subcooled to −220° F. [−140° C.] by heat exchange with the portions of the cold LNG (streams 42 and 43) as described previously. The subcooled reflux stream 53a is pumped to the operating pressure of demethanizer 21 by pump 19 and stream 53b at −220° F. [−140° C.] is then supplied as cold top column feed (reflux) to demethanizer 21. This cold liquid reflux absorbs and condenses the $C_2$ components and heavier hydrocarbon components from the vapors rising in the upper rectification section of demethanizer 21.

A summary of stream flow rates and energy consumption for the process illustrated in FIG. 1 is set forth in the following table:

TABLE I (FIG. 1)
Stream Flow Summary - Lb. Moles/Hr [kg moles/Hr]

| Stream | Methane | Ethane | Propane | Butanes+ | Total |
|---|---|---|---|---|---|
| 41 | 9,859 | 710 | 245 | 115 | 10,980 |
| 42 | 789 | 57 | 20 | 9 | 878 |
| 43 | 9,070 | 653 | 225 | 106 | 10,102 |
| 46 | 5,213 | 26 | 1 | 0 | 5,282 |
| 47 | 3,857 | 627 | 224 | 106 | 4,820 |
| 48 | 10,369 | 7 | 0 | 0 | 10,430 |
| 53 | 519 | 0 | 0 | 0 | 522 |
| 52 | 9,850 | 7 | 0 | 0 | 9,908 |
| 51 | 9 | 703 | 245 | 115 | 1,072 |

Recoveries*

| | |
|---|---|
| Ethane | 98.98% |
| Propane | 100.00% |
| Butanes+ | 100.00% |

Power

| | | |
|---|---|---|
| LNG Booster Pump | 123 HP | [ 203 kW] |
| Reflux Pump | 1 HP | [ 1 kW] |
| Supplemental Reflux Pump | 4 HP | [ 7 kW] |
| Liquid Feed Pump | 38 HP | [ 63 kW] |
| Vapor Feed Compressor | 453 HP | [ 745 kW] |
| LNG Product Pump | 821 HP | [1,349 kW] |
| Totals | 1,440 HP | [2,368 kW] |

Low Level Utility Heat

| | | |
|---|---|---|
| Liquid Feed Heater | 7,890 MBTU/Hr | [5,097 kW] |

High Level Utility Heat

| | | |
|---|---|---|
| Demethanizer Reboiler | 8,450 MBTU/Hr | [5,458 kW] |

*(Based on un-rounded flow rates)

There are four primary factors that account for the improved efficiency of the present invention. First, compared to many prior art processes, the present invention does not depend on the LNG feed itself to directly serve as the reflux for fractionation column 21. Rather, the refrigeration inherent in the cold LNG is used in heat exchanger 12 to generate a liquid reflux stream (stream 53) that contains very little of the $C_2$ components and heavier hydrocarbon components that are to be recovered, resulting in efficient rectification in the upper absorbing section of fractionation tower 21 and avoiding the equilibrium limitations of such prior art processes. Second, compared to many prior art processes, splitting the LNG feed into two portions before feeding fractionation column 21 allows more efficient use of low level utility heat, thereby reducing the amount of high level utility heat consumed by reboiler 25. The relatively colder portion of the LNG feed (stream 42b in FIG. 1) serves as a supplemental reflux stream for fractionation tower 21, providing partial rectification of the vapors in the vapor and liquid feed streams (streams 46a and 47c in FIG. 1) so that heating and partially vaporizing the other portion (stream 43) of the LNG feed does not unduly increase the condensing load in heat exchanger 12. Third, compared to many prior art processes, using a portion of the cold LNG feed (stream 42b in FIG. 1) as a supplemental reflux stream allows using less top reflux (stream 53b in FIG. 1) for fractionation tower 21. The lower top reflux flow, plus the greater degree of heating using low level utility heat in heat exchanger 17, results in less total liquid feeding fractionation column 21, reducing the duty required in reboiler 25 and minimizing the amount of high level utility heat needed to meet the specification for the bottom liquid product from the demethanizer. Fourth, compared to many prior art processes, the initial separation of the LNG into vapor and liquid fractions in separator 13 is performed at relatively low pressure. The relative volatilities between the lighter components (i.e., methane) and the desirable heavier components that are to be recovered (i.e., the $C_2$ and heavier components) are more favorable at lower pressure, resulting in less of the desirable components being present in stream 46a and subsequently requiring rectification in fractionation tower 21.

Example 2

An alternative embodiment of the present invention is shown in FIG. 2. The LNG composition and conditions considered in the process presented in FIG. 2 are the same as those in FIG. 1. Accordingly, the FIG. 2 process of the present invention can be compared to the embodiment displayed in FIG. 1.

In the simulation of the FIG. 2 process, the LNG to be processed (stream 41) from LNG tank 10 enters pump 11 at −255° F. [−159° C.]. Pump 11 elevates the pressure of the LNG sufficiently so that it can flow through heat exchangers and thence to separator 13. Stream 41a exiting the pump is split into two portions, streams 42 and 43. The first portion, stream 42, is heated to −220° F. [−140° C.] (stream 42a) in heat exchanger 12 and then is pumped to higher pressure by pump 18. Pumped stream 42b at −219° F. [−140° C.] is then supplied to fractionation column 21 at an upper mid-column feed point.

The second portion of stream 41a (stream 43) is heated prior to entering separator 13 so that at least a portion of it is vaporized. In the example shown in FIG. 2, stream 43 is heated in heat exchanger 12 so that heated stream 43a enters separator 13 at −169° F. [−112° C.] and 196 psia [1,351 kPa(a)] where the vapor (stream 46) is separated from any remaining liquid (stream 47). Stream 46 is compressed by compressor 14 to a pressure high enough to enter fractionation tower 21, operating at approximately 265 psia [1,825 kPa(a)]. The compressed vapor stream 46a is then divided into two portions, streams 49 and 50. Stream 49, comprising about 30% of the total compressed vapor, is thereafter supplied as feed to fractionation column 21 at a mid-column feed point.

The separator liquid (stream 47) is pumped to higher pressure by pump 15, and stream 47a is then heated to −153° F. [−103° C.] in heat exchanger 16 by providing cooling of the liquid product from the column (stream 51). The partially heated stream 47b is then further heated to −135° F. [−93° C.] (stream 47c) in heat exchanger 17 using low level utility heat before it is supplied to fractionation tower 21 at a lower mid-column feed point. The liquid product stream 51 exits the bottom of the tower at 40° F. [4° C.], and flows to storage or further processing after cooling to 0° F. [−18° C.] (stream 51a) in heat exchanger 16 as described previously.

Overhead vapor distillation stream 48 is withdrawn from the upper section of fractionation tower 21 at −166° F. [−110° C.] and mixes with the remaining portion of the compressed vapor (stream 50). The combined stream 54 at −155° F. [−104° C.] is totally condensed as it is cooled to −170° F. [−112° C.] in heat exchanger 12 as described previously. The condensed liquid (stream 54a) is then divided into two portions, streams 52 and 53. The first portion (stream 52) is the methane-rich lean LNG stream, which is then pumped by pump 20 to 1365 psia [9,411 kPa(a)] (stream 52a) for subsequent vaporization and/or transportation.

The remaining portion is reflux stream 53, which flows to heat exchanger 12 where it is subcooled to −220° F. [−140° C.] by heat exchange with the cold LNG (streams 42 and 43) as described previously. The subcooled reflux stream 53a is pumped to the operating pressure of demethanizer 21 by pump 19 and stream 53b at −220° F. [−140° C.] is then supplied as cold top column feed (reflux) to demethanizer 21. This cold liquid reflux absorbs and condenses the $C_2$ components and heavier hydrocarbon components from the vapors rising in the upper rectification section of demethanizer 21.

A summary of stream flow rates and energy consumption for the process illustrated in FIG. 2 is set forth in the following table:

TABLE II (FIG. 2)
Stream Flow Summary - Lb. Moles/Hr [kg moles/Hr]

| Stream | Methane | Ethane | Propane | Butanes+ | Total |
|---|---|---|---|---|---|
| 41 | 9,859 | 710 | 245 | 115 | 10,980 |
| 42 | 789 | 57 | 20 | 9 | 878 |
| 43 | 9,070 | 653 | 225 | 106 | 10,102 |
| 46 | 5,622 | 31 | 1 | 0 | 5,698 |
| 47 | 3,448 | 622 | 224 | 106 | 4,404 |
| 49 | 1,687 | 10 | 0 | 0 | 1,710 |
| 50 | 3,935 | 21 | 1 | 0 | 3,988 |
| 48 | 6,434 | 2 | 0 | 0 | 6,458 |
| 54 | 10,369 | 23 | 1 | 0 | 10,446 |
| 53 | 518 | 1 | 0 | 0 | 522 |
| 52 | 9,851 | 22 | 1 | 0 | 9,924 |
| 51 | 8 | 688 | 244 | 115 | 1,056 |

| Recoveries* | |
|---|---|
| Ethane | 96.82% |
| Propane | 99.76% |
| Butanes+ | 99.97% |

| Power | | |
|---|---|---|
| LNG Booster Pump | 126 HP | [ 207 kW] |
| Reflux Pump | 1 HP | [ 1 kW] |
| Supplemental Reflux Pump | 4 HP | [ 7 kW] |
| Liquid Feed Pump | 34 HP | [ 56 kW] |
| Vapor Compressor | 462 HP | [ 759 kW] |
| LNG Product Pump | 822 HP | [1,351 kW] |
| Totals | 1,449 HP | [2,381 kW] |

| Low Level Utility Heat | | |
|---|---|---|
| Liquid Feed Heater | 6,519 MBTU/Hr | [4,211 kW] |

| High Level Utility Heat | | |
|---|---|---|
| Demethanizer Reboiler | 9,737 MBTU/Hr | [6,290 kW] |

*(Based on un-rounded flow rates)

Comparing Table II above for the FIG. 2 embodiment of the present invention with Table I for the FIG. 1 embodiment of the present invention shows that the liquids recovery is slightly lower for the FIG. 2 embodiment since a significant portion of the LNG feed (stream 50) is not subjected to any rectification. As a result, the size of fractionation tower 21 can be significantly smaller for the FIG. 2 embodiment, since the vapor load in the tower (represented by overhead vapor stream 48) is so much lower. The resulting reduction in the capital cost of the plant may justify the slightly lower liquid recovery provided by this embodiment of the present invention.

Example 3

Another alternative embodiment of the present invention is shown in FIG. 3. The LNG composition and conditions considered in the process presented in FIG. 3 are the same as those in FIGS. 1 and 2. Accordingly, the FIG. 3 process of the present invention can be compared to the embodiments displayed in FIGS. 1 and 2.

In the simulation of the FIG. 3 process, the LNG to be processed (stream 41) from LNG tank 10 enters pump 11 at −255° F. [−159° C.]. Pump 11 elevates the pressure of the LNG sufficiently so that it can flow through heat exchangers and thence to separator 13. Stream 41a exiting the pump is split into two portions, streams 42 and 43. The first portion, stream 42, is heated to −220° F. [−140° C.] (stream 42a) in heat exchanger 12 and then is pumped to higher pressure by pump 18. Pumped stream 42b at −219° F. [−140° C.] is then supplied to fractionation column 21 at an upper mid-column feed point.

The second portion of stream 41a (stream 43) is heated prior to entering separator 13 so that at least a portion of it is vaporized. In the example shown in FIG. 3, stream 43 is heated in heat exchanger 12 so that heated stream 43a enters separator 13 at −168° F. [−111° C.] and 198 psia [1,365 kPa(a)] where the vapor (stream 46) is separated from any remaining liquid (stream 47). Stream 47 is pumped to higher pressure by pump 15, and stream 47a is then heated to −152° F. [−102° C.] in heat exchanger 16 by providing cooling of the liquid product from the column (stream 51). The partially heated stream 47b is then further heated to −135° F. [−93° C.] (stream 47c) in heat exchanger 17 using low level utility heat before it is supplied to fractionation tower 21 at a lower mid-column feed point. The liquid product stream 51 exits the bottom of the tower at 40° F. [5° C.], and flows to storage or further processing after cooling to 0° F. [−18° C.] (stream 51a) in heat exchanger 16 as described previously.

Overhead vapor distillation stream 48 is withdrawn from the upper section of fractionation tower 21 at −166° F. [−110° C.]. The vapor from separator 13 (stream 46) enters compressor 14 and is compressed to higher pressure, allowing stream 46a to mix with stream 48 to form stream 54. The combined stream 54 at −150° F. [−101° C.] is totally condensed as it is cooled to −169° F. [−112° C.] in heat exchanger 12 as described previously. The condensed liquid (stream 54a) is then divided into two portions, streams 52 and 53. The first portion (stream 52) is the methane-rich lean LNG stream, which is then pumped by pump 20 to 1365 psia [9,411 kPa(a)] (stream 52a) for subsequent vaporization and/or transportation.

The remaining portion is reflux stream 53, which flows to heat exchanger 12 where it is subcooled to −220° F. [−140° C.] by heat exchange with the cold LNG (streams 42 and 43) as described previously. The subcooled reflux stream 53a is pumped to the operating pressure of demethanizer 21 by pump 19 and stream 53b at −220° F. [−140° C.] is then supplied as cold top column feed (reflux) to demethanizer 21. This cold liquid reflux absorbs and condenses the $C_2$ components and heavier hydrocarbon components from the vapors rising in the upper rectification section of demethanizer 21.

A summary of stream flow rates and energy consumption for the process illustrated in FIG. 3 is set forth in the following table:

TABLE III (FIG. 3)
Stream Flow Summary - Lb. Moles/Hr [kg moles/Hr]

| Stream | Methane | Ethane | Propane | Butanes+ | Total |
|---|---|---|---|---|---|
| 41 | 9,859 | 710 | 245 | 115 | 10,980 |
| 42 | 789 | 57 | 20 | 9 | 878 |
| 43 | 9,070 | 653 | 225 | 106 | 10,102 |

TABLE III-continued (FIG. 3)
Stream Flow Summary - Lb. Moles/Hr [kg moles/Hr]

| Stream | Methane | Ethane | Propane | Butanes+ | Total |
|---|---|---|---|---|---|
| 46 | 5,742 | 34 | 1 | 0 | 5,819 |
| 47 | 3,328 | 619 | 224 | 106 | 4,283 |
| 48 | 4,627 | 1 | 0 | 0 | 4,639 |
| 54 | 10,369 | 35 | 1 | 0 | 10,458 |
| 53 | 518 | 2 | 0 | 0 | 523 |
| 52 | 9,851 | 33 | 1 | 0 | 9,935 |
| 51 | 8 | 677 | 244 | 115 | 1,045 |

Recoveries*

| | |
|---|---|
| Ethane | 95.37% |
| Propane | 99.63% |
| Butanes+ | 99.96% |

Power

| | | |
|---|---|---|
| LNG Booster Pump | 127 HP | [ 209 kW] |
| Reflux Pump | 1 HP | [ 1 kW] |
| Supplemental Reflux Pump | 4 HP | [ 7 kW] |
| Liquid Feed Pump | 32 HP | [ 53 kW] |
| Vapor Compressor | 457 HP | [ 751 kW] |
| LNG Product Pump | 826 HP | [1,358 kW] |
| Totals | 1,447 HP | [2,379 kW] |

Low Level Utility Heat

| | | |
|---|---|---|
| Liquid Feed Heater | 6,109 MBTU/Hr | [3,946 kW] |

High Level Utility Heat

| | | |
|---|---|---|
| Demethanizer Reboiler | 10,350 MBTU/Hr | [6,686 kW] |

*(Based on un-rounded flow rates)

Comparing Table III above for the FIG. 3 embodiment of the present invention with Tables I and II for the FIGS. 1 and 2, respectively, embodiments of the present invention shows that the liquids recovery is somewhat lower for the FIG. 3 embodiment since still more of the LNG feed (all of the compressed separator vapor, stream 46a) is not subjected to any rectification. Accordingly, the size of fractionation tower 21 can be still smaller for the FIG. 3 embodiment, since the vapor load in the tower (represented by overhead vapor stream 48) is even lower. Thus, the capital cost of the FIG. 3 embodiment of the present invention will likely be lower than either the FIG. 1 or the FIG. 2 embodiment. The choice of which embodiment to use for a particular application will generally be dictated by the relative value of the heavier hydrocarbon components, the relative costs of power and high level utility heat, and the relative capital costs of fractionation towers, pumps, heat exchangers, and compressors.

Example 4

Another alternative embodiment of the present invention is shown in FIG. 4. The LNG composition and conditions considered in the process presented in FIG. 4 are the same as those in FIGS. 1 through 3. Accordingly, the FIG. 4 process of the present invention can be compared to the embodiments displayed in FIGS. 1 through 3.

In the simulation of the FIG. 4 process, the LNG to be processed (stream 41) from LNG tank 10 enters pump 11 at −255° F. [−159° C.]. Pump 11 elevates the pressure of the LNG sufficiently so that it can flow through heat exchange and thence to separator 13 and fractionation column 21. Stream 41a exiting the pump is split into two portions, streams 42 and 43. The first portion, stream 42, is heated to −165° F. [−109° C.] (stream 42a) in heat exchanger 12 and then is supplied to fractionation column 21 at an upper mid-column feed point. Depending on the discharge pressure of pump 11, a valve 30 may be needed to reduce the pressure of stream 42b to that of fractionation column 21.

The second portion of stream 41a (stream 43) is heated prior to entering separator 13 so that at least a portion of it is vaporized. In the example shown in FIG. 4, stream 43 is heated in heat exchanger 12 so that heated stream 43a enters separator 13 at −168° F. [−111° C.] and 195 psia [1,342 kPa(a)] where the vapor (stream 46) is separated from the remaining liquid (stream 47). Stream 47 is pumped to higher pressure by pump 15, and stream 47a is then heated to −155° F. [−104° C.] in heat exchanger 16 by providing cooling of the liquid product from the column (stream 51). The partially heated stream 47b is then further heated so that a portion of it is vaporized. In the example of FIG. 4, steam 47b is further heated in heat exchanger 17 using low level utility heat so that the further heated stream 47c enters separator 26 at 9° F. [−13° C.] and 750 psia [5,169 kPa where vapor stream 55 is separated from any remaining liquid stream 56. The separator liquid stream (stream 56) is expanded to the operating pressure (approximately 195 psia [1,342 kPa(a)]) of fractionation column 21 by expansion valve 23, cooling stream 56a to −36° F. [−38° C.] before it is supplied to fractionation column 21 at a lower mid-column feed point.

The vapor from separator 26 (stream 55) enters a work expansion machine 27 in which mechanical energy is extracted from this portion of the higher pressure feed. The machine 27 expands the vapor substantially isentropically to the tower operating pressure with the work expansion cooling the expanded stream 55a to a temperature of −74° F. [−59° C.]. This partially condensed expanded stream 55a is thereafter supplied as feed to fractionation column 21 at a mid-column feed point.

The liquid product stream 51 exits the bottom of the tower at 17° F. [−9° C.]. After cooling to 0° F. [−18° C.] in heat exchanger 16 as described previously, the liquid product stream 51a flows to storage or further processing.

Overhead vapor distillation stream 48 is withdrawn from the upper section of fractionation tower 21 at −178° F. [−117° C.]. The vapor from separator 13 (stream 46) mixes with stream 48 to form stream 54. The combined stream 54 at −174° F. [−114° C.] flows to compressor 28 driven by expansion machine 27, where it is compressed to 266 psia [1,835 kPa(a)] (stream 54a). Stream 54a is totally condensed as it is cooled to −168° F. [−111° C.] in heat exchanger 12 as described previously. The condensed liquid (stream 54b) is then divided into two portions, streams 52 and 53. The first portion (stream 52) is the methane-rich lean LNG stream, which is then pumped by pump 20 to 1365 psia [9,411 kPa(a)] (stream 52a) for subsequent vaporization and/or transportation.

The remaining portion is reflux stream 53, which flows to heat exchanger 12 where it is subcooled to −225° F. [−143° C.] by heat exchange with the cold LNG (streams 42 and 43) as described previously. The subcooled reflux stream 53a is expanded to the operating pressure of demethanizer 21 in valve 31 and the expanded stream 53b at −225° F. [−143° C.] is then supplied as cold top column feed (reflux) to demethanizer 21. This cold liquid reflux absorbs and condenses the $C_2$ components and heavier hydrocarbon components from the vapors rising in the upper rectification section of demethanizer 21.

A summary of stream flow rates and energy consumption for the process illustrated in FIG. 4 is set forth in the following table:

TABLE IV (FIG. 4)
Stream Flow Summary-Lb. Moles/Hr [kg moles/Hr]

| Stream | Methane | Ethane | Propane | Butanes+ | Total |
|---|---|---|---|---|---|
| 41 | 9,859 | 710 | 245 | 115 | 10,980 |
| 42 | 2,465 | 177 | 61 | 29 | 2,745 |
| 43 | 7,394 | 533 | 184 | 86 | 8,235 |
| 46 | 4,812 | 29 | 1 | 0 | 4,877 |
| 47 | 2,582 | 504 | 183 | 86 | 3,358 |
| 55 | 2,503 | 445 | 133 | 44 | 3,128 |
| 56 | 79 | 59 | 50 | 42 | 230 |
| 48 | 6,132 | 9 | 0 | 0 | 6,163 |
| 54 | 10,944 | 38 | 1 | 0 | 11,040 |
| 53 | 1,093 | 4 | 0 | 0 | 1,104 |
| 52 | 9,851 | 34 | 1 | 0 | 9,936 |
| 51 | 8 | 676 | 244 | 115 | 1,044 |

| Recoveries* | | | | | |
|---|---|---|---|---|---|
| Ethane | | | 95.21% | | |
| Propane | | | 99.71% | | |
| Butanes+ | | | 99.96% | | |

| Power | | |
|---|---|---|
| LNG Booster Pump | 159 HP | [ 261 kW] |
| Liquid Feed Pump | 143 HP | [ 235 kW] |
| LNG Product Pump | 826 HP | [1,358 kW] |
| Totals | 1,128 HP | [1,854 kW] |

| Low Level Utility Heat | | |
|---|---|---|
| Liquid Feed Heater | 14,410 MBTU/Hr | [9,308 kW] |

| High Level Utility Heat | | |
|---|---|---|
| Demethanizer Reboiler | 2,945 MBTU/Hr | [1,902 kW] |

*(Based on un-rounded flow rates)

Comparing Table IV above for the FIG. 4 embodiment of the present invention with Table III for the FIG. 3 embodiment shows that the liquids recovery is essentially the same for this FIG. 4 embodiment, but now the Vapor Compressor has been eliminated in favor of additional liquid pumping. Because pumping is more efficient than compression, this results in a net decrease in total power consumption of approximately 22% compared to the FIGS. 1 through 3 embodiments. The FIG. 4 embodiment is also able to use more low level utility heat and thereby reduce the use of high level utility heat compared to the FIGS. 1 through 3 embodiments. The high level utility heat requirement of the FIG. 4 embodiment is only 28% to 35% of that required by the FIGS. 1 through 3 embodiments.

The size of fractionation tower 21 is somewhat larger than the FIG. 3 embodiment, since the vapor load in the tower (represented by overhead vapor stream 48) is somewhat higher. However, the capital cost of this FIG. 4 embodiment of the present invention will likely be lower than the FIG. 3 embodiment because of the elimination of the vapor compression service. The choice of which embodiment to use for a particular application will generally be dictated by the relative value of the heavier hydrocarbon components, the relative costs of power and high level utility heat, and the relative capital costs of fractionation towers, pumps, heat exchangers, and compressors.

Other Embodiments

Some circumstances may favor subcooling reflux stream 53 with another process stream, rather than using the cold LNG streams that enter heat exchanger 12. Other circumstances may favor no subcooling at all. The decision regarding whether or not to subcool reflux stream 53 before it is fed to the column will depend on many factors, including the LNG composition, the desired recovery level, etc. As shown by the dashed lines in FIGS. 1 through 4, stream 53 can be routed to heat exchanger 12 if subcooling is desired, but it need not be if no subcooling is desired. Likewise, heating of supplemental reflux stream 42 before it is fed to the column must be evaluated for each application. As shown by the dashed lines in FIGS. 1 through 4, stream 42 need not be routed to heat exchanger 12 if no heating is desired.

When the LNG to be processed is leaner or when complete vaporization of the LNG in heat exchanger 17 is contemplated, separator 26 in FIG. 4 may not be justified. Depending on the quantity of heavier hydrocarbons in the inlet LNG and the pressure of the LNG stream leaving liquid feed pump 15, the heated LNG stream leaving heat exchanger 17 may not contain any liquid (because it is above its dewpoint, or because it is above its cricondenbar). In such cases, separator 26 may be eliminated as shown by the dashed lines.

In the examples shown, total condensation of stream 48a in FIG. 1, stream 54a in FIGS. 2 and 3, and stream 54b in FIG. 4 is shown. Some circumstances may favor subcooling these streams, while other circumstances may favor only partial condensation. Should partial condensation of these streams be used, processing of the uncondensed vapor may be necessary, using a compressor or other means to elevate the pressure of the vapor so that it can join the pumped condensed liquid. Alternatively, the uncondensed vapor could be routed to the plant fuel system or other such use.

Depending on the composition of the LNG to be processed, it may be possible to operate separator 13 at a sufficiently high pressure that compressor 14 (FIGS. 1 through 3) and pump 15 (FIGS. 1 through 4) are not needed to supply the vapor (stream 46) and liquid (stream 47) to fractionation tower 21. Should the relative volatilities in separator 13 be favorable enough to allow achieving the desired recovery level with the separator pressure higher than that of the tower, compressor 14 (FIGS. 1 through 3) and pump 15 (FIGS. 1 through 4) may be eliminated as shown by the dashed lines.

In FIGS. 1 through 4, individual heat exchangers have been shown for most services. However, it is possible to combine two or more heat exchange services into a common heat exchanger, such as combining heat exchangers 12 and 16 in FIGS. 1 through 4 into a common heat exchanger. In some cases, circumstances may favor splitting a heat exchange service into multiple exchangers. The decision as to whether to combine heat exchange services or to use more than one heat exchanger for the indicated service will depend on a number of factors including, but not limited to, LNG flow rate, heat exchanger size, stream temperatures, etc.

In FIGS. 1 through 3, individual pumps have been shown for the reflux pumping requirements (pumps 18 and 19). However, it is possible to achieve the pumping indicated by pump 19 with pump 20 alone and to achieve the pumping indicated by pump 18 with pump 11 alone at some increase in overall pumping power. If pump 19 is deleted in favor of additional pumping by pump 20, stream 53 is taken from the discharge stream from pump 20 as shown by the dashed line. In that case, pump 19 is eliminated as shown by it being dashed in FIGS. 1 through 3. If pump 18 is deleted in favor of additional pumping by pump 11, the discharge pressure from pump 11 will be higher than that shown in each of the FIGS. 1 through 3 embodiments and an appropriate pressure reduction valve (such as dashed valve 22) may be required so as to maintain the operating pressure in separator 13 at the desired level. In that case, pump 18 is eliminated as shown by it being dashed in FIGS. 1 through 3.

In FIG. 4, it may also be possible to further reduce pumping requirements by addition of one or more pumping services. For example, it may be possible to reduce the discharge pressure of pump 11 by adding a pump in line 42a that would pump that stream individually to fractionation column 21 and reduce the pressure drop taken in valve 22 in stream 43 upstream of heat exchanger 12. The decision as to whether to combine pumping services or use more than one pump for an indicated service will depend on a number of factors including, but not limited to, LNG flow rate, stream temperatures, etc.

It will be recognized that the relative amount of feed found in each branch of the split LNG feed to fractionation column 21 will depend on several factors, including LNG composition, the amount of heat which can economically be extracted from the feed, and the quantity of horsepower available. More feed to the top of the column may increase recovery while increasing the duty in reboiler 25 and thereby increasing the high level utility heat requirements. Increasing feed lower in the column reduces the high level utility heat consumption but may also reduce product recovery. The relative locations of the mid-column feeds may vary depending on LNG composition or other factors such as the desired recovery level and the amount of vapor formed during heating of the feed streams. Moreover, two or more of the feed streams, or portions thereof, may be combined depending on the relative temperatures and quantities of individual streams, and the combined stream then fed to a mid-column feed position.

In the examples given for the FIGS. 1 through 4 embodiments, recovery of $C_2$ components and heavier hydrocarbon components is illustrated. However, it is believed that the FIGS. 1 through 4 embodiments are also advantageous when recovery of only $C_3$ components and heavier hydrocarbon components is desired.

While there have been described what are believed to be preferred embodiments of the invention, those skilled in the art will recognize that other and further modifications may be made thereto, e.g. to adapt the invention to various conditions, types of feed, or other requirements without departing from the spirit of the present invention as defined by the following claims.

We claim:

1. A process for the separation of liquefied natural gas containing methane and heavier hydrocarbon components into a volatile liquid fraction containing a major portion of said methane and a relatively less volatile liquid fraction containing a major portion of said heavier hydrocarbon components wherein (a) said liquefied natural gas is divided into at least a first stream and a second stream;

(b) said first stream is supplied to a fractionation column at an upper mid-column feed position;

(c) said second stream is heated sufficiently to partially vaporize it, thereby forming a vapor stream and a liquid stream;

(d) said vapor stream is supplied to said fractionation column at a first lower mid-column feed position;

(e) said liquid stream is pumped to higher pressure and heated and is thereafter supplied to said fractionation column at a second lower mid-column feed position;

(f) a vapor distillation stream is withdrawn from an upper region of said fractionation column and cooled sufficiently to at least partially condense it, forming thereby a condensed stream, with said cooling supplying at least a portion of said heating of said second stream;

(g) said condensed stream is divided into at least said volatile liquid fraction containing a major portion of said methane and a reflux stream;
(h) said reflux stream is supplied to said fractionation column at a top column feed position; and
(i) the quantity and temperature of said reflux stream and the temperatures of said feeds to said fractionation column are effective to maintain the overhead temperature of said fractionation column at a temperature whereby the major portion of said heavier hydrocarbon components is recovered by fractionation in said relatively less volatile liquid fraction.

2. A process for the separation of liquefied natural gas containing methane and heavier hydrocarbon components into a volatile liquid fraction containing a major portion of said methane and a relatively less volatile liquid fraction containing a major portion of said heavier hydrocarbon components wherein
   (a) said liquefied natural gas is divided into at least a first stream and a second stream;
   (b) said first stream is heated and is thereafter supplied to a fractionation column at an upper mid-column feed position;
   (c) said second stream is heated sufficiently to partially vaporize it, thereby forming a vapor stream and a liquid stream;
   (d) said vapor stream is supplied to said fractionation column at a first lower mid-column feed position;
   (e) said liquid stream is pumped higher pressure and heated and is thereafter supplied to said fractionation column at a second lower mid-column feed position;
   (f) a vapor distillation stream is withdrawn from an upper region of said fractionation column and cooled sufficiently to at least partially condense it, forming thereby a condensed stream, with said cooling supplying at least a portion of said heating of said first stream and said second stream;
   (g) said condensed stream is divided into at least said volatile liquid fraction containing a major portion of said methane and a reflux stream;
   (h) said reflux stream is supplied to said fractionation column at a top column feed position; and
   (i) the quantity and temperature of said reflux stream and the temperatures of said feeds to said fractionation column are effective to maintain the overhead temperature of said fractionation column at a temperature whereby the major portion of said heavier hydrocarbon components is recovered by fractionation in said relatively less volatile liquid fraction.

3. A process for the separation of liquefied natural gas containing methane and heavier hydrocarbon components into a volatile liquid fraction containing a major portion of said methane and a relatively less volatile liquid fraction containing a major portion of said heavier hydrocarbon components wherein
   (a) said liquefied natural gas is divided into at least a first stream and a second stream;
   (b) said first stream is supplied to a fractionation column at an upper mid-column feed position;
   (c) said second stream is heated sufficiently to partially vaporize it, thereby forming a vapor stream and a liquid stream;
   (d) said vapor stream is divided into at least a first vapor stream and a second vapor stream;
   (e) said first vapor stream is supplied to said fractionation column at a first lower mid-column feed position;
   (f) said liquid stream is heated and is thereafter supplied to said fractionation column at a second lower mid-column feed position;
   (g) a vapor distillation stream is withdrawn from an upper region of said fractionation column and combined with said second vapor stream to form a combined vapor stream;
   (h) said combined vapor stream is cooled sufficiently to at least partially condense it, forming thereby a condensed stream, with said cooling supplying at least a portion of said heating of said second stream;
   (i) said condensed stream is divided into at least said volatile liquid fraction containing a major portion of said methane and a reflux stream;
   (j) said reflux stream is supplied to said fractionation column at a top column feed position; and
   (k) the quantity and temperature of said reflux stream and the temperatures of said feeds to said fractionating column are effective to maintain the overhead temperature of said fractionation column at a temperature whereby the major portion of said heavier hydrocarbon components is recovered by fractionation in said relatively less volatile liquid fraction.

4. A process for the separation of liquefied natural gas containing methane and heavier hydrocarbon components into a volatile liquid fraction containing a major portion of said methane and a relatively less volatile liquid fraction containing a major portion of said heavier hydrocarbon components wherein
   (a) said liquefied natural gas is divided into at least a first stream and a second stream;
   (b) said first stream is heated and is thereafter supplied to a fractionation column at an upper mid-column feed position;
   (c) said second stream is heated sufficiently to partially vaporize it, thereby forming a vapor stream and a liquid stream;
   (d) said vapor stream is divided into at least a first vapor stream and a second vapor stream;
   (e) said first vapor stream is supplied to said fractionation column at a first lower mid-column feed position;
   (f) said liquid stream is heated and is thereafter supplied to said fractionation column at a second lower mid-column feed position;
   (g) a vapor distillation stream is withdrawn from an upper region of said fractionation column and combined with said second vapor stream to form a combined vapor stream;
   (h) said combined vapor stream is cooled sufficiently to at least partially condense it, forming thereby a condensed stream, with said cooling supplying at least a portion of said heating of said first stream and said second stream;
   (i) said condensed stream is divided into at least said volatile liquid fraction containing a major portion of said methane and a reflux stream;
   (j) said reflux stream is supplied to said fractionation column at a top column feed position; and
   (k) the quantity and temperature of said reflux stream and the temperatures of said feeds to said fractionation column are effective to maintain the overhead temperature of said fractionation column at a temperature whereby the major portion of said heavier hydrocarbon components is recovered by fractionation in said relatively less volatile liquid fraction.

5. A process for the separation of liquefied natural gas containing methane and heavier hydrocarbon components into a volatile liquid fraction containing a major portion of said methane and a relatively less volatile liquid fraction containing a major portion of said heavier hydrocarbon components wherein (a) said liquefied natural gas is divided into at least a first stream and a second stream;

(b) said first stream is supplied to a fractionation column at an upper mid-column feed position;

(c) said second stream is heated sufficiently to partially vaporize it, thereby forming a vapor stream and a liquid stream;

(d) sad liquid stream is heated and is thereafter supplied to said fractionation column at a lower mid-column feed position;

(e) a vapor distillation stream is withdrawn from an upper region of said fractionation column and combined with said vapor stream to form a combined vapor stream;

(f) said combined vapor stream is cooled sufficiently to at least partially condense it, forming thereby a condensed stream, with said cooling supplying at least a portion of said heating of said second stream;

(g) said condensed stream is divided into at least said volatile liquid fraction containing a major portion of said methane and a reflux stream;

(h) said reflux stream is supplied to said fractionation column at a top column feed position; and (i) the quantity and temperature of said reflux stream and the temperatures of said feeds to said fractionation column are effective to maintain the overhead temperature of said fractionation column at a temperature whereby the major portion of said heavier hydrocarbon components is recovered by fractionation in said relatively less volatile liquid fraction.

6. A process for the separation of liquefied natural gas containing methane and heavier hydrocarbon components into a volatile liquid fraction containing a major portion of said methane and a relatively less volatile liquid fraction containing a major portion of said heavier hydrocarbon components wherein (a) said liquefied natural gas is divided into at least a first stream and a second stream;

(b) said first stream is heated and is thereafter supplied to a fractionation column at an upper mid-column feed position;

(c) said second stream is heated sufficiently to partially vaporize it, thereby forming a vapor stream and a liquid stream;

(d) said liquid stream is heated and is thereafter supplied to said fractionation column at a lower mid-column feed position;

e) a vapor distillation stream is withdrawn from an upper region of said fractionation column and combined with said vapor stream to form a combined vapor stream;

(f) said combined vapor stream is cooled sufficiently to at least partially condense it, forming thereby a condensed stream, with said cooling supplying at least a portion of said heating of said first stream and said second stream;

(g) said condensed stream is divided into at least said volatile liquid fraction containing a major portion of said methane and a reflux stream;

(h) said reflux stream is supplied to said fractionation column at a top column feed position; and (i) the quantity and temperature of said reflux stream and the temperatures of said feeds to said fractionation column are effective to maintain the overhead temperature of said fractionation column at a temperature whereby the major portion of said heavier hydrocarbon components is recovered by fractionation in said relatively less volatile liquid fraction.

7. A process for the separation of liquefied natural gas containing methane and heavier hydrocarbon components into a volatile liquid fraction containing a major portion of said methane and a relatively less volatile liquid fraction containing a major portion of said heavier hydrocarbon components wherein (a) said liquefied natural gas is divided into at least a first stream and a second stream;

(b) said first stream is supplied to a fractionation column at an upper mid-column feed position;

(c) said second stream is heated sufficiently to partially vaporize it, thereby forming a first vapor stream and a first liquid stream;

(d) said first liquid stream is heated sufficiently to at least partially vaporize it, thereby forming a second vapor stream and a second liquid stream;

(e) said second vapor stream is expanded to lower pressure and is supplied to said fractionation column at a first lower mid-column feed position;

(f) said second liquid stream is expanded to said tower pressure and is supplied to said fractionation column at a second lower mid-column feed position;

(g) a vapor distillation stream is withdrawn from an upper region of said fractionation column and combined with said first vapor stream to form a combined vapor stream;

(h) said combined vapor stream is compressed to higher pressure and is thereafter cooled sufficiently to at least partially condense it, forming thereby a condensed stream, with said cooling supplying at least a portion of said heating of said second stream;

(i) said condensed stream is divided into at least said volatile liquid fraction containing a major portion of said methane and a reflux stream;

(j) said reflux stream is supplied to said fractionation column at a top column feed position; and (k) the quantity and temperature of said reflux stream and the temperatures of said feeds to said fractionation column are effective to maintain the overhead temperature of said fractionation column at a temperature whereby the major portion of said heavier hydrocarbon components is recovered by fractionation in said relatively less volatile liquid fraction.

8. A process for the separation of liquefied natural gas containing methane and heavier hydrocarbon components into a volatile liquid fraction containing a major portion of said methane and a relatively less volatile liquid fraction containing a major portion of said heavier hydrocarbon components wherein (a) said liquefied natural gas is divided into at least a first stream and a second stream;

(b) said first stream is heated and is thereafter supplied to a fractionation column at an upper mid-column feed position;

(c) said second stream is heated sufficiently to partially vaporize it, thereby forming a first vapor stream and a first liquid stream;

(d) said first liquid stream is heated sufficiently to at least partially vaporize it, thereby forming a second vapor stream and a second liquid stream;

(e) said second vapor stream is expanded to lower pressure and is supplied to said fractionation column at a first lower mid-column feed position;

(f) said second liquid stream is expanded to said lower pressure and is supplied to said fractionation column at a second lower mid-column feed position;

(g) a vapor distillation stream is withdrawn from an upper region of said fractionation column and combined with said first vapor stream to form a combined vapor stream;

(h) said combined vapor stream is compressed to higher pressure and is thereafter cooled sufficiently to at least partially condense it, forming thereby a condensed stream, with said cooling supplying at least a portion of said heating of said first stream and said second stream;

(i) said condensed stream is divided into at least said volatile liquid fraction containing a major portion of said methane and a reflux stream;

(j) said reflux stream is supplied to said fractionation column at a top column feed position; and (k) the quantity and temperature of said reflux stream and the temperatures of said feeds to said fractionation column are effective to maintain the overhead temperature of said fractionation column at a temperature whereby the major portion of said heavier hydrocarbon components is recovered by fractionation in said relatively less volatile liquid fraction.

9. The process according to claim 1 wherein said vapor stream is compressed to higher pressure, whereupon said compressed vapor stream is thereafter supplied to said fractionation column at said first lower mid-column feed position.

10. The process according to claim 2 wherein said vapor stream is compressed to higher pressure, whereupon said compressed vapor stream is thereafter supplied to said fractionation column at said first lower mid-column feed position.

11. The process according to claim 3 wherein (a) said vapor stream is compressed to higher pressure, whereupon said compressed vapor stream is thereafter divided into at least said first vapor stream and said second vapor stream; and (b) said liquid stream is pumped to higher pressure and heated, whereupon said heated pumped liquid stream is thereafter supplied to said fractionation column at said second lower mid-column feed position.

12. The process according to claim 4 wherein (a) said vapor stream is compressed to higher pressure, whereupon said compressed vapor stream is thereafter divided into at least said first vapor stream and said second vapor stream; and (b) said liquid stream is pumped to higher pressure and heated, whereupon said heated pumped liquid stream is thereafter supplied to said fraction column at said second lower mid-column feed position.

13. The process according to claim 5 wherein (a) said vapor stream is compressed to higher pressure, whereupon said compressed vapor stream is combined with said vapor distillation stream to form said combined vapor stream; and (b) said liquid stream is pumped to higher pressure and heated, whereupon said heated pumped liquid stream is thereafter supplied to said fractionation column at said lower mid-column feed position.

14. The process according to claim 6 wherein (a) said vapor stream is compressed to higher pressure, whereupon said compressed vapor stream is combined with said vapor distillation stream to form said combined vapor stream; and (b) said liquid stream is pumped to higher pressure and heated, whereupon said heated pumped liquid stream is thereafter supplied to said fractionation column at said lower mid-column feed position.

15. The process according to claim 7 wherein said first liquid stream is pumped to higher pressure and thereafter heated sufficiently to at least partially vaporize it, thereby forming said second vapor stream and said second liquid stream.

16. The process according to claim 8 wherein said first liquid stream is pumped to higher pressure and thereafter heated sufficiently to at least partially vaporize it, thereby forming said second vapor stream and said second liquid stream.

17. The process according to claim 1, 3, 5, 7, 9, 11, 13, or 15 wherein said reflux stream is further cooled and is thereafter supplied to said fractionation column a said top column feed position, with said cooling supplying at least a portion of said heating of said second stream.

18. The process according to claim 2, 4, 6, 8, 10, 12, 14, or 16 wherein said reflux stream is further cooled and is thereafter supplied to said fractionation column at said top column feed position, with said cooling supplying at least a portion of said heating of said first stream and said second stream.

19. apparatus for the separation or liquefied natural gas containing methane and heavier hydrocarbon components into a volatile liquid fraction containing a major portion of said methane and a relatively less volatile liquid fraction containing a major portion of said heavier hydrocarbon components comprising (a) first dividing means connected to receive said liquefied natural gas and divide it into at least a first stream and a second stream;

(b) said first dividing means further connected to a fractionation column to supply said first stream at an upper mid-column feed position;

(c) heat exchange means connected to said first dividing means to receive said second stream and heat it sufficiently to partially vaporize it;

(d) separation means connected to said heat exchange means to receive said heated partially vaporized second stream and separate it into a vapor stream and a liquid stream;

(e) said separation means further connected to said fractionation column to supply said vapor stream at a first lower mid-column feed position;

(f) pumping means connected to said separation means to receive said liquid stream and pump it to higher pressure;

(g) heating means connected to said pumping means to receive said pumped liquid stream and heat it, said heating means being further connected to said fractionation column to supply said heated liquid stream at a second lower mid-column feed position;

(h) withdrawing means connected to an upper region of said fractionation column to withdraw a vapor distillation stream;

(i) said heat exchange means further connected to said withdrawing means to receive said vapor distillation stream and cool it sufficiently to at least partially condense it and form thereby a condensed steam, with said cooling supplying at least a portion of said heating of said second stream;

(j) second dividing means connected to said heat exchange means to receive said condensed stream and divide it into at least said volatile liquid fraction containing a major portion of said methane and a reflux stream, said second dividing means being further connected to said fractionation column to supply said reflux stream to said fractionation column at a top column feed position; and (k) control means adapted to regulate the quantity and temperature of said reflux stream and the temperatures of said feed streams to said fractionation column to maintain the overhead temperature of said fractionation column at a temperature whereby the major portion of said heavier hydrocarbon components is recovered by fractionation in said relatively less volatile liquid fraction.

20. An apparatus for the separation of liquefied natural gas containing methane and heavier hydrocarbon components into a volatile liquid fraction containing a major portion of said methane and a relatively less volatile liquid fraction containing a major portion of said heavier hydrocarbon components comprising (a) first dividing means connected to receive said liquefied natural gas and divide it into at least a first stream and second stream;

(b) heat exchange means connected to said first dividing means receive said first stream and heat it:

(c) said heat exchange means further connected to a fractionation column to supply said heated first stream at an upper mid-column feed position;

(d) said heat exchange means further connected to said first dividing means to receive said second stream and heat it sufficiently to partially vaporize it;

(e) separation means connected to said heat exchange means to receive said heated partially vaporized second stream and separate it into a vapor stream and a liquid stream;

(f) said separation means further connected to said fractionation column to supply said vapor stream at a first lower mid-column feed position;

(g) pumping means connected to said separation means to receive said liquid stream and pump it to higher pressure;

(h) heating means connected to said pumping means to receive said liquid stream and heat it, said heating means being further connected to said fractionation column to supply said pumped heated liquid stream at a second lower mid-column feed position;

(i) withdrawing means connected to an upper region of said fractionation column to withdraw a vapor distillation stream;

(j) said heat exchange means further connected to said withdrawing means to receive said vapor distillation stream and cool it sufficiently to at least partially condense it and form thereby a condensed steam, with said cooling supplying at least a portion of said heating of said first stream and said second stream;

(k) second dividing means connected to said heat exchange means to receive said condensed stream and divide it into at least said volatile liquid fraction containing a major portion of said methane and a reflux stream, said second dividing means being further connected to said fractionation column to supply said reflux stream to said fractionation column at a top column feed position; and (l) control means adapted to regulate the quantity and temperature of said reflux stream and the temperatures of said feed streams to said fractionation column to maintain the overhead temperature of said fractionation column at a temperature hereby the major portion of said heavier hydrocarbon components is recovered by fractionation in said relatively less volatile liquid fraction.

21. An apparatus for the separation of liquefied natural gas containing methane and heavier hydrocarbon components into a volatile liquid fraction containing a major portion of said methane and a relatively less volatile liquid fraction containing a major portion of said heavier hydrocarbon components comprising (a) first dividing means connected to receive said liquefied natural gas and divide it into at least a first stream and a second stream;

(b) said first dividing means further connected to a fractionation column to supply said first stream at an upper mid-column feed position;

(c) heat exchange means connected to said first dividing means to receive said second stream and heat it sufficiently to partially vaporize it;

(d) separation means connected to said heat exchange means to receive stream heated partially vaporized second stream and separate it into a vapor stream and a liquid stream;

(e) second dividing means connected to said separation means to receive said vapor stream and divide it into at least a first vapor stream and a second vapor stream;

(f) said second dividing means further connected to said fractionation column to supply said first vapor stream at a first lower mid-column feed position;

(g) heating means connected to said separation means to receive said liquid stream and heat it, said heating means being her connected to said fractionation column to supply said heated liquid stream at a second lower mid-column feed position;

(h) withdrawing means connected to an upper region of said fractionation column to withdraw a vapor distillation stream;

(i) combining means connected to said withdrawing means and said second dividing means to receive said vapor distillation stream and said second vapor stream and form a combined vapor stream;

(j) said heat exchange means further connected to said combining means to receive said combined vapor stream and cool it sufficiently to at least partially condense it and form thereby a condensed steam, with said cooling supplying at least a portion of said heating of said second stream;

(k) third dividing means connected to said heat exchange means to receive said condensed stream and divide it into at least said volatile liquid fraction containing a major portion of said methane and a reflux stream, said third dividing means being further connected to said fractionation column to supply said reflux stream to said fractionation column at a top column feed position; and (l) control means adapted to regulate the quantity and temperature of said reflux stream and the temperatures of said feed streams to said fractionation column to maintain the overhead temperature of said fractionation column at a temperature whereby the major portion of said heavier hydrocarbon components is recovered by fractionation in said relatively less volatile liquid fraction.

22. apparatus for the separation of liquefied natural gas containing methane and heavier hydrocarbon components Into a volatile liquid fraction containing a major portion of said methane and a relatively less volatile liquid fraction containing a major portion of said heavier hydrocarbon components comprising (a) first dividing means connected to receive said liquefied natural gas and divide it into at least a first stream and a second stream;

(b) heat exchange means connected to said first dividing means receive said first stream and heat it;

(c) said heat exchange means further connected to a fractionation column to supply said heated first stream at an upper mid-column feed position (d) said heat exchange means further connected to said first dividing means to receive said second stream and heat it sufficiently to partially vaporize it;

(e) separation means connected to said heat exchange means to receive said heated partially vaporized second stream and separate it into a vapor stream and a liquid stream;

(f) second dividing means connected to said separation means to receive said vapor stream and divide it into at least a first vapor stream and a second vapor stream;

(g) said second dividing means further connected to said fractionation column to supply said first vapor stream at a first lower mid-column feed position;

(h) heating means connected to said separation means to receive said liquid stream and heat it, said heating means being further connected to said fractionation column to supply said heated liquid stream at a second lower mid-column feed position;

(i) withdrawing means connected to an upper region of said fractionation column to withdraw a vapor distillation stream;

(j) combining means connected to said withdrawing means and said second dividing means to receive said vapor distillation stream and said second vapor stream and form a combined vapor stream;

(k) said heat exchange means further connected to said combining means to receive said combined vapor stream and cool it sufficiently to at least partially condense it and form thereby a condensed steam, with said cooling supplying at least a portion of said heating of said first stream and said second stream;

(l) third dividing means connected to said heat exchange means to receive said condensed stream and dividing it into at least said volatile liquid fraction containing a major portion of said methane and a reflux stream, said third dividing means being further connected to said fractionation column to column said reflux stream to said fractionation column at a top column feed position; and (m) control means adapted to regulate the quantity and temperature of said reflux stream and the temperatures of said feed streams to said fractionation column to maintain the overhead temperature of said fractionation column at a temperature whereby the major portion of said heavier hydrocarbon components is recovered by fractionation in said relatively less volatile liquid fraction.

23. An apparatus for the separation of liquefied natural gas containing methane and heavier hydrocarbon components into a volatile liquid fraction containing a major portion of said methane and a relatively less volatile liquid fraction containing a major portion of said heavier hydrocarbon components comprising (a) first dividing means connected to receive said liquefied natural gas and divide it into at least a first stream and a second stream;

(b) said first dividing means further connected to a fractionation column to supply said first stream at an upper mid-column feed position;

(c) heat exchange means connected to said first dividing means to receive said second stream and heat it sufficiently to partially vaporize it;

(d) separation means connected to said heat exchange means to receive said heated partially vaporized second stream and separate it into a vapor stream and a liquid stream:

(e) heating means connected to said separation means to receive said liquid steam and heat it, said heating means being a further connected to said fractionation column to supply said heated liquid stream at a lower mid-column feed position;

(f) withdrawing means connected to an upper region of said fractionation column to withdraw a vapor distillation stream;

(g) combining means connected to said withdrawing means and said separation means to receive said vapor distillation stream and said vapor stream and form a combined vapor stream;

(h) said heat exchange means further connected to said combining means to receive said combined vapor stream and cool it sufficiently to at least partially condense it and form thereby a condensed steam, with said cooling supplying at least a portion of said heating of said second stream;

(i) second dividing means connected to said heat exchange means to receive said condensed stream and divide it into at least said volatile liquid fraction containing a major portion of said methane and a reflux stream, said second dividing means being further connected to said fractionation column to supply said reflux stream to said fractionation column at a top column feed position; and (j) control means adapted to regulate the quantity and temperature of said reflux stream and the temperatures of said feed streams to said fractionation column to maintain the overhead temperature of said fractionation column at a temperature whereby the major portion of said heavier hydrocarbon components is recovered by fractionation in said relatively less volatile liquid fraction.

24. An apparatus for the separation of liquefied natural gas containing methane and heavier hydrocarbon components into a volatile liquid fraction containing a major portion of said methane and a relatively less volatile liquid fraction containing major portion of said heavier hydrocarbon components comprising (a) first dividing means connected to receive said liquefied natural gas and divide it into at least a first stream and a second stream;

(b) heat exchange means connected to said first dividing means receive said first stream and heat it;

(c) said heat exchange means further connected to a fractionation column to supply said heated first stream at an upper mid-column feed position;

(d) said heat exchange means further connected to said first dividing means to receive said second stream and heat it sufficiently to partially vaporize it;

(e) separation means connected to said heat exchange means to receive said heated partially vaporize second stream and separate it into a vapor stream and a liquid stream;

(f) heating means connected to said separation means to receive said liquid stream and heat it, said heating means being further connected to said fractionation column to supply said heated liquid stream at a lower mid-column feed position;

(g) withdrawing means connected to an upper region of said fractionation column to withdraw a vapor distillation stream;

(h) combining means connected to said withdrawing means and said separation means to receive said vapor distillation stream and said vapor stream and form a combined vapor stream;

(i) said heat exchange means further connected to said combining means to receive said combined vapor stream and cool it sufficiently to at least partially condense it and form thereby a condensed steam, with said cooling supplying at least a portion of said heating of said first stream and said second stream;

(j) second dividing means connected to said heat exchange means to receive said condensed stream and divide it into at least said volatile liquid fraction containing a major portion of said methane and a reflux stream, said second dividing means being further connected to said fractionation column to supply said reflux stream to said fractionation column at a top column feed position; and (k) control means adapted to regulate the quantity and temperature of said reflux stream and the temperatures of said feed streams to said fractionation column to maintain the overhead temperature of said fractionation column at a temperature whereby the major portion of said heavier hydrocarbon components is recovered by fractionation in said relatively less volatile liquid fraction.

25. An apparatus for the separation of liquefied natural gas containing methane and heavier hydrocarbon components into a volatile liquid fraction containing a major portion of said methane and a relatively less volatile liquid fraction containing a major portion of said heavier hydrocarbon components comprising (a) first dividing means connected to receive said liquefied natural gas and divide it into at least a first stream and a second stream;

(b) said first dividing means further connected to a fractionation column to supply said first stream at an upper mid-column feed position;

(c) heat exchange means connected to said first dividing means to receive said second stream and heat it sufficiently to partially vaporize it;

(d) first separation means connected to said heat exchange means to receive said heated partially vaporized second stream and separate it into a first vapor stream and a first liquid stream;

(e) heating means connected to said first separation means to receive said first liquid stream and heat it sufficiently to at least partially vaporize it;

(f) second separation means connected to said heating means to receive said at least partially vaporized heated first liquid stream and separate it into a second vapor stream and a second liquid stream;

(g) first expansion means connected to said second separation means to receive said second vapor stream and expand it to lower pressure, said first expansion means being further connected to said fractionation column to supply said expanded second vapor stream at a first lower mid-column feed position;

(h) second expansion means connected to said second separation means to receive said second liquid stream and expand it to said lower pressure, said second expansion means being further connected to said fractionation column to supply said expanded second liquid stream at a second lower mid-column feed position;

(i) withdrawing means connected to an upper region of said fractionation column to withdraw a vapor distillation stream;

(j) combining means connected to said withdrawing means and said first separation means to receive said vapor distillation stream and said first vapor stream and form a combined vapor stream;

(k) compressing means connected to said combining means to receive said combined vapor stream and compress to higher pressure;

(l) said heat exchange means further connected to said compressing means to receive said compressed combined vapor stream and cool it sufficiently to at least partially condense it and form thereby a condensed steam, with said cooling supplying at least a portion of said heating of said second stream;

(m) second dividing means connected to said heat exchange means to receive said condensed stream and divide it into at least said volatile liquid fraction containing a major portion of said methane and a reflux stream, said second dividing means being further connected to said fractionation column to supply said reflux stream to said fractionation column at a top column feed position; and (n) control means adapted to regulate the quantity and temperature of said reflux stream and the temperatures of said feed streams to said fractionation column to maintain the overhead temperature of said fractionation column at a temperature hereby the major portion of said heavier hydrocarbon components is recovered by fractionation in said relatively less volatile liquid fraction.

26. An apparatus for the separation of liquefied natural gas containing methane and heavier hydrocarbon components into a volatile liquid fraction containing a major portion of said methane and a relatively less volatile liquid fraction containing a major portion of said heavier hydrocarbon components comprising (a) first dividing means connected to receive said liquefied natural gas and divide it into at least a first stream and a second stream;

(b) heat exchange means connected to said first dividing means receive said first stream and heat it;

(c) said heat exchange means further connected to a fractionation column to supply said heated first stream at an upper mid-column feed position;

(d) said heat exchange means further connected to said first dividing means to receive said second stream and heat it sufficiently to partially vaporize it;

(e) first separation means connected to said heat exchange means to receive said heated partially vaporized second stream and separate it into a first vapor stream and a first liquid stream;

(f) heating means connected to said first separation means to receive said first liquid stream and heat it sufficiently to at least partially vaporize it;

(g) second separation means connected to said heating means to receive said at least partially vaporized heated first liquid stream and separate it into a second vapor stream and a second liquid stream;

(h) first expansion means connected to said second separation means to receive said second vapor stream and expand it to lower pressure, said first expansion means being further connected to said fractionation column to supply said expanded second vapor stream at a first lower mid-column feed position;

(i) second expansion means connected to said second separation means to receive said second liquid stream and expand it to said lower pressure, said second expansion means being further connected to said fractionation column to supply said expanded second liquid stream at a second lower mid-column feed position;

(j) withdrawing means connected to an upper region of said fractionation column to withdraw a vapor distillation stream;

(k) combining means connected to said withdrawing means and said first separation means to receive said vapor distillation stream and said first vapor stream and form a combined vapor stream;

(l) compressing means connected to said combining means to receive said combined vapor stream and compress it to higher pressure;

(m) said heat exchange means further connected to said compressing means to receive said compressed combined vapor stream and cool it sufficiently to at least partially condense it and form thereby a condensed steam, with said cooling supplying at least a portion of said heating of said first stream and said second stream;

(n) second dividing means connected to said heat exchange means to receive said condensed stream and divide it into at least said volatile liquid fraction containing a major portion of said methane and a reflux stream, said second dividing means being further connected to said fractionation column to supply said reflux stream to said fractionation column at a top column feed position; and (o) control means adapted to regulate the quantity and temperature of said reflux stream and the temperatures of said feed streams to said fractionation column to maintain the overhead temperature of said fractionation column at a temperature whereby the major portion of said heavier hydrocarbon components is recovered by fractionation in said relatively less volatile liquid fraction.

27. The apparatus according to claim 19 wherein a compressing means is connected to said separation means to receive said vapor stream and compress it to higher pressure, said compressing means being further connected to said fractionation column to supply said compressed vapor stream at said first lower mid-column feed position.

28. The apparatus according to claim 20 wherein a compressing means is connected to said separation means to receive said vapor stream and compress it to higher pressure, said compressing means being further connected to said fractionation column to supply said compressed vapor stream at said first lower mid-column feed position.

29. The apparatus according to claim 21 wherein
(a) a compressing means is connected to said separation means to receive said vapor stream and compress it to higher pressure;
(b) said second dividing means is connected to said compressing means to receive said compressed vapor stream and divide it into at least said first vapor stream and said second vapor stream;
(c) a pumping means is connected to said separation means to receive said liquid stream and pump it to higher pressure; and
(d) said heating means is connected to said pumping means to receive said pumped liquid stream, said heating means being adapted to heat said pumped liquid stream and thereafter supply said heated pumped liquid stream at said second lower mid-column feed position.

30. The apparatus according to claim 22 wherein
(a) a compressing means is connected to said separation means to receive said vapor stream and compress it to higher pressure;
(b) said second dividing means is connected to said compressing means to receive said compressed vapor stream and divide it into at least said first vapor stream and said second vapor stream;
(c) a pumping means is connected to said separation means to receive said liquid stream and pump it to higher pressure; and
(d) said heating means is connected to said pumping means to receive said pumped liquid stream, said heating means being adapted to heat said pumped liquid stream and thereafter supply said heated pumped liquid stream at said second lower mid-column feed position 31. The apparatus according to claim 23 wherein
(a) a compressing means is connected to said separation means to receive said vapor stream and compress it to higher pressure, said compressing means being further connected to said combining means to supply said compressed vapor stream to said combining means and combine it with sad vapor distillation stream to form said combined vapor stream;
(b) pumping means is connected to said separation means to receive said liquid stream and pump it to higher pressure; and
(c) said heating means is connected to said pumping means to receive said pumped liquid stream, said heating means being adapted to heat said pumped liquid stream and thereafter supply said heated pumped liquid stream at said lower mid-column feed position.

32. The apparatus according to claim 24 wherein
(a) a compressing means is connected to said separation means to receive said vapor stream and compress it to higher pressure, said compressing means being further connected to said combining means to supply said compressed vapor stream to said combining means and combine it with said vapor distillation stream to form said combined vapor stream;
(b) a pumping means is connected to said separation means to receive said liquid stream and pump it to higher pressure; and
(c) said heating means is connected to said pumping means to receive said pumped liquid stream, said heating means being adapted to heat said pumped liquid stream and thereafter supply said heated pumped liquid stream at said lower mid-column feed position.

33. The apparatus according to claim 25 wherein
(a) a pumping means is connected to said first separation means to receive said first liquid stream and pump it to higher pressure; and
(b) said heating means is connected to said pumping means to receive said pumped first liquid stream, said heating means being adapted to heat said pumped first liquid stream sufficiently to at least partially vaporized it, forming thereby said at least partially vaporized heated stream.

34. The apparatus according to claim 26 wherein
(a) a pumping means is connected to said first separation means to receive said first liquid stream and pump it to higher pressure; and
(b) said heating means is connected to said pumping means to receive said pumped first liquid stream, said heating means being adapted to heat said pumped first liquid stream sufficiently to at least partially vaporize it, forming thereby said at least partially vaporized heated stream.

35. The apparatus according to claim 19, 23, 25, 27, 31, or 33 wherein said heat exchange means is further connected to said second dividing means to receive said reflux stream and further cool it, said heat exchange means being further connected to said fractionation column to supply said further cooled reflux stream at said top column feed position, with said cooling supplying at least a portion of said heating of said second stream.

36. The apparatus according to claim 21 or 29 wherein said heat exchange means is further connected to said third dividing means to receive said reflux stream and further cool it, said heat exchange means being further connected to said fractionation column to supply supply said further cooled reflux stream at said top column feed position, with said cooling supplying at least a portion of said heating of said second stream.

37. The apparatus according to claim 20, 24, 26, 28, 32, or 34 wherein said heat exchange means is further connected to said second dividing means to receive said reflux stream and further cool it, said heat exchange means being further connected to said fractionation column to supply said further cooled reflux stream at said top column feed position, with said cooling supplying at least a portion of said heating of said first stream and said second stream.

38. The apparatus according to claim 22 or 30 wherein said heat exchange means is further connected to said third dividing means to receive said reflux stream and further cool it, said heat exchange means being further connected to said fractionation column to supply said further cooled reflux stream at said top column feed position, with said cooling supplying at least a portion of said heating of said first stream and said second stream.

* * * * *

UNITED STATES PATENT AND TRADEMARK OFFICE
CERTIFICATE OF CORRECTION

PATENT NO. : 7,631,516 B2
APPLICATION NO. : 11/749268
DATED : December 15, 2009
INVENTOR(S) : Kyle T. Cuellar et al.

It is certified that error appears in the above-identified patent and that said Letters Patent is hereby corrected as shown below:

COLUMN 9

Line 19, "[5,169 kPa" should read --[5,169 kPa(a)]--.

COLUMN 13

Line 29, "higher" should read --to higher--.

COLUMN 14

Line 18, "fractionating" should read --fractionation--.

COLUMN 15

Line 11, "sad" should read --said--.

COLUMN 16

Line 23, "tower" should read --lower--.

COLUMN 18

Line 23, "apparatus" should read --An apparatus--; and "or" should read --of--.

COLUMN 19

Line 19, "second" should read --a second--;
    Line 21, "receive" should read --to receive--;
    Line 49, "steam," should read --stream,--; and
    Line 63, "hereby" should read --whereby--.

Signed and Sealed this

Eleventh Day of May, 2010

David J. Kappos
*Director of the United States Patent and Trademark Office*

COLUMN 20

Line 15, "stream" should read --said--;
Line 26, "her" should read --further--;
Line 39, "steam," should read --stream,--;
Line 56, "apparatus" should read --An apparatus--; and
Line 67, "receive" should read --to receive--.

COLUMN 21

Line 3, "position" should read --position;--;
Line 33, "steam," should read --stream,--; and
Line 37, "dividing" should read --divide--.

COLUMN 22

Line 6, "steam" should read --stream--;
Line 7, "a" should be deleted;
Line 20, "steam," should read --stream,--;
Line 42, "major" should read --a major--;
Line 48, "receive" should read --to receive--; and
Line 56, "vaporize" should read --vaporized--.

COLUMN 23

Line 8, "steam," should read --stream,--.

COLUMN 24

Line 12, "steam," should read --stream,--;
Line 26, "hereby" should read --whereby--; and
Line 39, "receive" should read --to receive--.

COLUMN 25

Line 17, "steam," should read --stream,--.

COLUMN 26

Line 12, "position" should read --position.--;
Line 19, "sad" should read --said--; and
Line 52, "vaporized" should read --vaporize--.

COLUMN 27

Line 10, "supply supply" should read --supply--.